United States Patent
LeTourneur et al.

(10) Patent No.: US 8,447,890 B1
(45) Date of Patent: May 21, 2013

(54) OPERATION OF MULTIPLE MASTERS/HOSTS THROUGH A HUB

(75) Inventors: Herve LeTourneur, Mountain View, CA (US); Hans Van Antwerpen, Mountain View, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 234 days.

(21) Appl. No.: 12/917,454

(22) Filed: Nov. 1, 2010

Related U.S. Application Data (60) Provisional application No. 61/256,945, filed on Oct. 30, 2009.

(51) Int. Cl.
*G06F 3/00* (2006.01)
*G06F 13/12* (2006.01)
*G06F 13/14* (2006.01)
*G06F 13/20* (2006.01)

(52) U.S. Cl.
USPC .................. 710/8; 710/63; 710/305; 710/313

(58) Field of Classification Search
None
See application file for complete search history.

(56) References Cited

U.S. PATENT DOCUMENTS

| | | | | |
|---|---|---|---|---|
| 6,732,218 | B2* | 5/2004 | Overtoom et al. | 710/313 |
| 7,478,191 | B2* | 1/2009 | Wurzburg et al. | 710/316 |
| 2006/0056401 | A1* | 3/2006 | Bohm et al. | 370/360 |
| 2006/0059293 | A1* | 3/2006 | Wurzburg et al. | 710/313 |
| 2006/0227759 | A1* | 10/2006 | Bohm et al. | 370/351 |
| 2008/0005262 | A1* | 1/2008 | Wurzburg et al. | 709/217 |

* cited by examiner

*Primary Examiner* — Idriss N Alrobaye
*Assistant Examiner* — Richard B Franklin (57) ABSTRACT

A multiple master USB hub device and method for enabling multiple OTG and host devices to control peripherals and slave devices with a connection of the multiple OTG and host devices to the USB hub device. The multiple master USB hub device is configured to enable at least two USB devices connected thereto to each be configured as host/master elements to control OTG and peripheral/slave devices connected to the USB hub device, the USB hub device comprising an element configured to switch configuration of each of the at least two USB devices to a host/master configuration at different predetermined times.

20 Claims, 10 Drawing Sheets

Mode 1: "B" configured as an upstream Port

OPERATION OF MULTIPLE MASTERS/HOSTS THROUGH A HUB

RELATED APPLICATIONS

This application claims the benefit of U.S. Provisional Application No. 61/256,945, filed Oct. 30, 2009, the disclosure of which is incorporated herein by reference.

TECHNICAL FIELD

This application relates to USB hubs and particularly to multimaster USB hub devices.

BACKGROUND

The Universal Serial Bus (USB) has become the standard for connectivity of personal computers, notebook or laptop computers and related devices, to peripherals devices, such as printers, external memory devices, speakers, scanners, cameras, smart phones, mp3 players and the like. Standard USB hubs serve to extend the availability of USB connections on a single device and are generally configured with four USB connectivity ports (in a non externally powered USB hub) and up to about seven ports.

The ports of the USB hub conventionally function as "upstream" and "downstream" USB ports, with one port being designated as the upstream port which is connected to a controlling device such as a PC, also known as the "master" or "host". The other remaining ports are downstream to the hub and PC, and are used to connect to peripherals, designated as "slave" devices. Common master-slave functions include printing by printers, as directed by PCs, exchange of data (download and upload) of data between memory devices and a PC, as controlled by the PC, and download of songs to mp3 devices as selected and controlled by the PC.

Over the past decade, devices such as cell phones and smart phones in particular and similar devices (the iPad® tablet, book readers from various sources, PDAs, etc.) have proliferated, with USB ports (usually with a mini USB port connection). These devices have useful functions as both controlled slave devices, such as with synchronized connection with PCs, and as master or host devices for connection with peripherals such as memory storage devices. A protocol was developed for these type of devices, in 2001 (with wider availability by 2004), known as USB On-The-Go (OTG), wherein devices such as cell phones (or cradles associated therewith), equipped with OTG elements, could automatically assume either a master (controlling) function when connected to a peripheral device such as a memory card or a slave (peripheral) function, when connected to a master PC, such as for synchronization. Other OTG devices include the aforementioned electronic tablets, book readers, and PDAs, as well as mp3 players, cameras, card readers, printers, dvd reader/writers and the like. It is, however, specifically recognized in the field that OTG host/peripheral (master/slave) function swapping works only with a one-to-one connection and does not work through a standard USB hub.

With the use of a standard USB hub, the connected OTG device is frozen into a single function depending on its upstream/downstream port connection with the hub. As a result, the OTG device may become a simple host, without possibility of operative connection to another host such as a PC. Thus, if such a hub is connected to an OTG device, all the downstream ports are now purely host ports, and therefore one can no longer connect to a host port, with OTG functionality being lost and the entire system behaving as a host only.

DETAILED DESCRIPTION

Embodiments of a USB hub device and system are disclosed herein, which may allow multiple masters to connect and share numerous peripheral devices. Though, according to USB hub protocols, only a single master owns all the peripherals at any specific point in time, the device has switchable manual or dynamic ownership switching between multiple masters. The resultant hub device may permit several masters, particularly USB OTG devices to behave as both master and slave without loss of swapping capability.

Connection of an OTG device to a downstream port may permit a connected OTG device to maintain its master/slave switchability. A connected OTG device may thus connect to an external host port, as a peripheral, at one time, and as a host, at other times, to other peripherals. As result, and for example, a PC and a handheld device, such as a smart phone, may be able to dynamically alternatively share the same USB peripheral devices with both the handheld device and PC assuming ownership of downstream devices.

An alternative function is where the OTG devices are themselves alternatively master or host and slave or peripheral devices relative to each other.

As used herein, the term "USB hub" includes the routing and connection functions of a USB hub device but is not limited to any particular power management function or to a power management function at all.

As used herein, the term "OTG", as applied to devices, also includes devices not compliant or partially compliant with the standard "OTG" protocols, but which have the OTG function of being able to become a host/master or a slave/peripheral depending on connections or impressed instructions.

Generally, a multiple master USB hub device may be configured to enable at least two USB devices connected thereto to each be configured as host/master elements to control OTG and peripheral/slave devices connected to the USB hub device. The USB hub device includes a switching element configured to switch configuration of each of at least two USB devices to a host/master configuration, at different predetermined times.

Also disclosed herein is an embodiment of a method for enabling multiple OTG and host devices to control peripherals and slave devices with a connection of the multiple OTG and host devices to a USB hub device.

The method includes the processes associated with initially connecting at least two of any combination of host and OTG USB devices to a USB hub device. Thereafter, one OTG or host USB device automatically or manually assumes a host/master configuration. The remaining OTG USB devices concomitantly assume peripheral/slave configurations (by protocol, only one of OTG USB devices connected to a USB hub may be a host/master at a time and by default, remaining OTG USB devices become slave/peripherals).

Other selected OTG USB or host device are then automatically or manually switched to the host/master control configuration. This is accompanied by the remaining OTG USB devices assuming peripheral/slave configurations. The switching continues, as desired or needed, with other selected OTG USB or host devices assuming host/master control configuration. OTG USB or host devices previously configured as host/master may reassume such configuration as predetermined. When one OTG USB or host device assumes host/master control configuration, the remaining OTG USB or host devices assume peripheral/slave control configurations An embodiment of the multiple master USB hub device includes at least two standard USB hubs within a housing, each having a single upstream port and multiple downstream ports. The device further includes multiple external USB OTG ports, each configured for connection to a respective OTG device. The number of USB OTG ports is at least equal to the number of contained hub devices, with each USB OTG port being internally connected to a respective standard hub, at the upstream port thereof. Multiple OTG modules are individually connected to and associated with a respective USB OTG port and positioned in the connection between the associated USB OTG port and the upstream port of the respective standard USB hub. Each OTG module is configured to detect or determine OTG status of an OTG device connected to the OTG port associated therewith, as master or slave, at any given moment.

In addition to each OTG detect switch member being connected to the upstream port of the respective USB hub device the OTG module may further be connected to a downstream port of another standard USB hub device. As a result, when one OTG module detects or determines that the OTG port, associated therewith, is connected to an OTG device with a master status, the one OTG module maintains an electrical routing to the connected upstream port of a connected standard USB hub and the remaining OTG modules disconnect connection to their respective standard USB hub upstream ports and the remaining OTG modules each may connect to downstream ports of the standard USB hubs devices. A switching element in the multiple master USB hub device may be configured to selectively change master/slave status of each of OTG devices connected to the respective USB OTG ports and to cause the respective OTG modules to direct appropriate connection of the respective USB OTG devices to an upstream or downstream port of a standard USB hub.

Thus, different OTG devices connected to the multiple master USB hub device may alternatively functionally assume master controlling status as well as functionally assuming slave/peripheral status, at predetermined time periods or intervals.

The multiple master (or multi-master) USB hub device may, in one embodiment, functionally connect multiple OTG devices, with maintained master/slave switching capability. In a further embodiment, the multiple master USB hub device further includes at least two external downstream port for connection to peripherals and the sharing of master control thereof by the connected OTG or master (e.g., PC) devices. In such latter embodiment, downstream ports of each of the standard hubs are connected to a switch element such as a multilane USB switch element, which, in turn, leads into external USB peripheral ports for connection to USB peripheral devices. The switch element selects the routing connection to the standard USB hub connected to the OTG port and device having master designation and control at any given moment.

The device may further include a manually or dynamically (automatically) activated switching element configured to selectively change master/slave status of each of OTG devices connected to the respective USB OTG ports and to cause the respective OTG modules to direct appropriate connection of the respective USB OTG devices to an upstream or downstream port of a USB hub. An automatic switching element may be preferably operatively triggered by one of a preset operating condition, such as completion of a data download, and a preset time interval such as a pulse cycle.

A method embodiment for permitting multiple OTG and host devices to control peripherals and slave devices with a single USB hub connection includes connecting at least two standard USB hubs within a housing to a corresponding number of USB OTG ports with external USB connection elements, wherein each USB OTG port may be connected to an upstream port of one of the standard USB hubs respectively and to a downstream hub of the other standard USB hubs. At least two of any combination of host and OTG USB devices are connected to the external USB connections. One connection between a USB OTG port and the upstream hub port to which it connected may be automatically or manually activating whereby a host or USB OTG USB device connected to the USB OTG port assumes a host/master configuration. At the same time connection between the remaining USB OTG ports and their respective hub ports are deactivated, whereby remaining OTG USB devices connected to other USB OTG ports are actively connected to downstream hub ports to assume peripheral/slave configurations. The automatic or manual activation may be repeated with another selected USB OTG port (or to a previously selected USB OTG port) to switch host/master configuration to a host or OTG USB device connected to the selected OTG USB port as necessary or desired, continuously or for a predetermined number of times.

Figure 1:
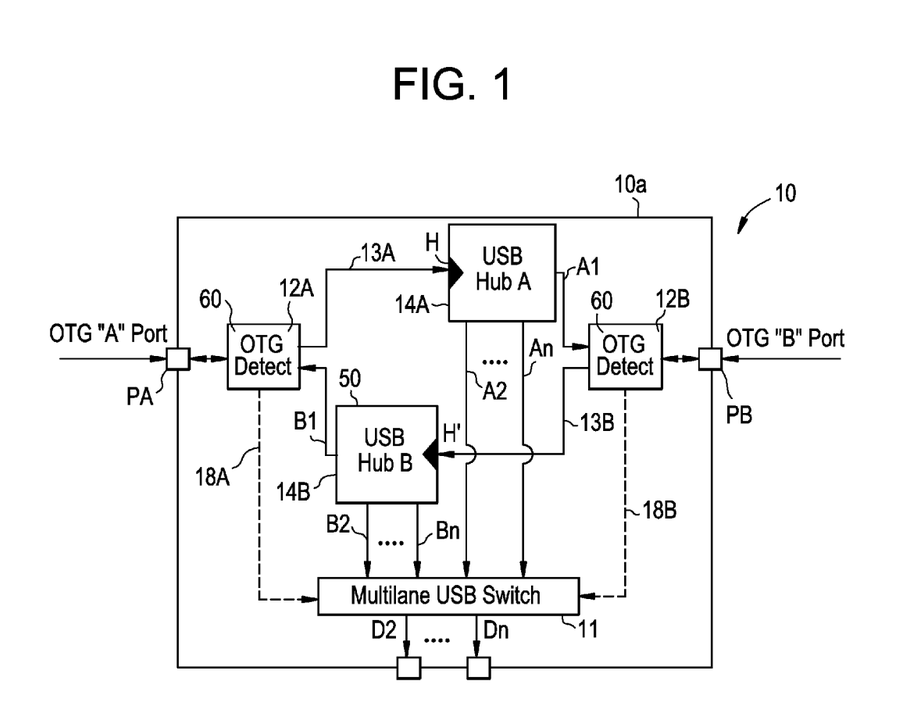
FIG. 1 is a circuit overview of an embodiment of a dual USB hub master with retention of master/slave OTG switching capability.

With reference to the drawings, in FIG. 1, an embodiment of a dual master USB hub 10 is shown with a housing 10a having contained standard USB hubs 14A and 14B. Each of the standard hubs 14A and 14B has an upstream port H and H' respectively and respective downstream ports A1 . . . An and connections, and B1 . . . Bn and connections.

The downstream hub ports A2 . . . An and B2 . . . Bn are shown as being connected to multilane USB switch 11, for selective operative connection from the standard hubs 14A and 14B to external downstream ports D2 . . . Dn, for connection to peripheral devices. OTG USB ports PA and PB may be externally accessible for connection to respective OTG devices (e.g., cell phones, cameras, PDAs, mp3 players, electronic tablets and electronic book readers and like—hand held cell phones, as shown in FIGS. 7-9D are illustrative of OTG devices) with each port being directly connected to an associated OTG module 12A and 12B respectively. In one embodiment, the respective OTG modules 12A and 12B are respectively directly electrically connected to the upstream ports H and H' of the standard USB hub 14A and 14B respectively and downstream ports A1 and B1 respectively. OTG modules 12A and 12B are selectively directly connected to the multilane USB switch 11 via connections 18A and 18B respectively for direct connections, bypassing the respective standard hubs.

One of the OTG ports, may be initially assigned a priority as being connected to a master device and it is herein arbitrarily assigned to OTG port PA. In one embodiment a PC may be connected to OTG port PA, an OTG device (not shown) may be connected to OTG port PB and the PC is a default host/master, which, in operation, may be recognized by both OTG module 12A and OTG module 12B. OTG module 12A may route electrical signals from the PC to the upstream port of standard USB hub 14A and OTG module 12B may route the master signal from downstream port A1 to an OTG device connected at OTG port PB. Since only one device connected to a USB hub can be a host/master, the device connected at OTG port PB becomes a slave or peripheral.

Downstream ports A2 . . . An may lead to multilane USB switch 11 which, in one embodiment, connects the lines from standard USB hub 14A to control devices connected to ports D2 . . . Dn as slave devices. The circuit connection between OTG module 12B to standard USB hub 14B at upstream port H', may be cut out of the loop and deactivated by the OTG module 12B.

Figure 5:
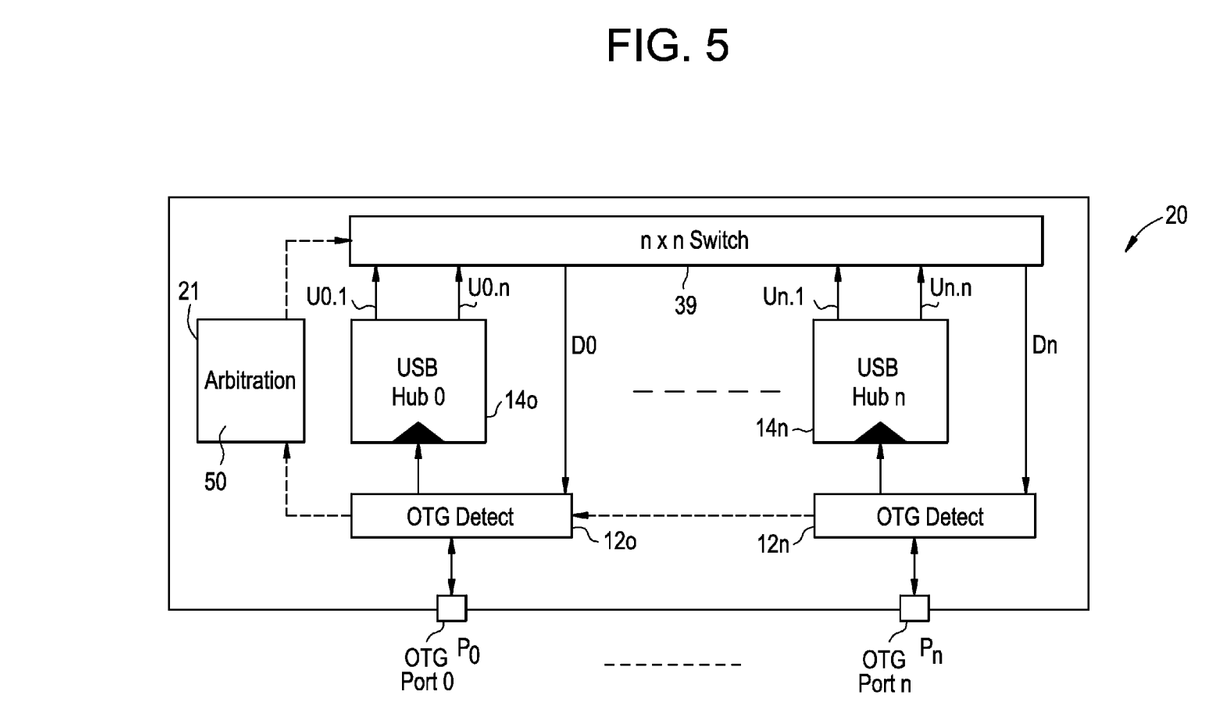
FIG. 5 is a circuit overview generalization for an (n+1) OTG USB ports hub embodiment.
Figure 6:
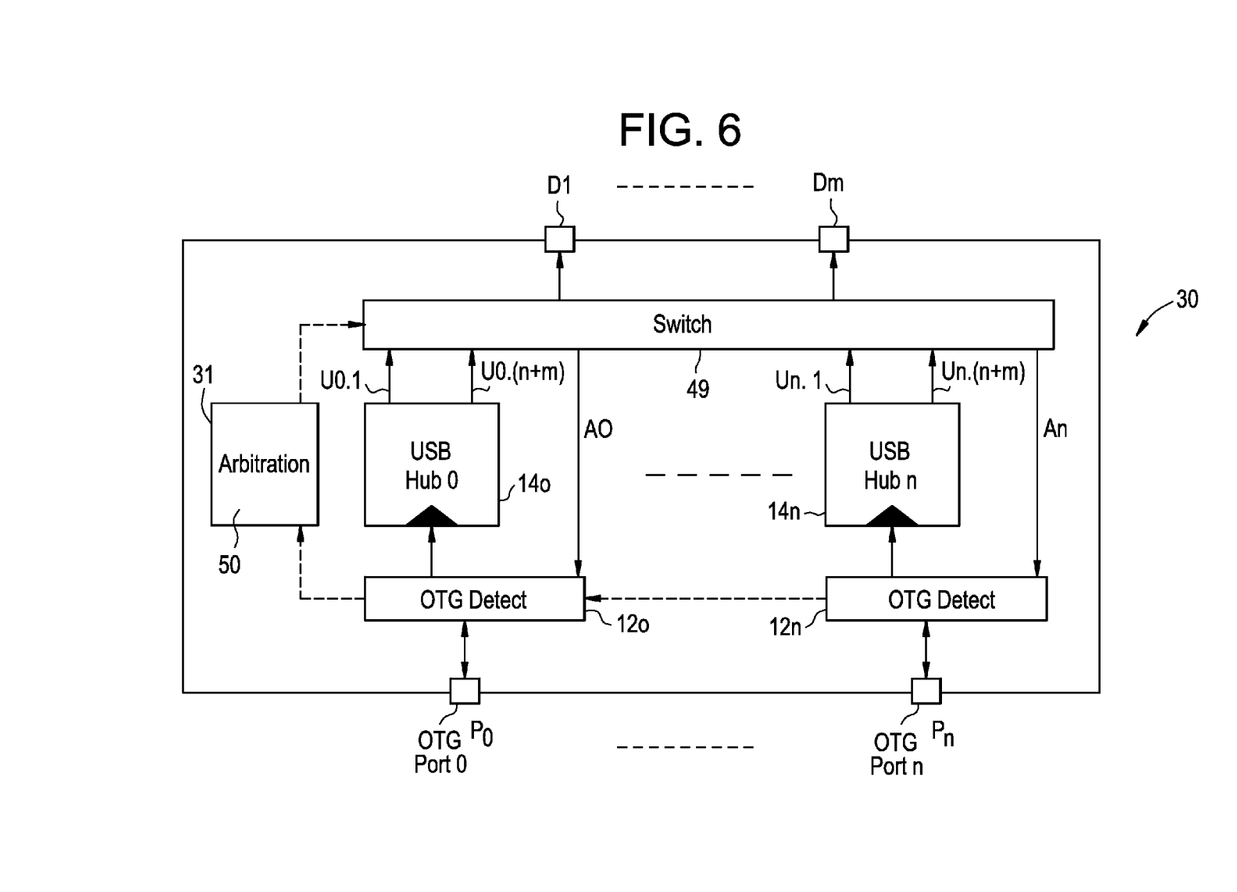
FIG. 6 is a circuit overview generalization for an (n+1) OTG and m downstream USB ports hub embodiment.

In order to enable the OTG device connected at OTG port PB to assume a master configuration, either a manual switch or a timed or otherwise connected control, signals OTG module 12A to cut off the master controlling PC circuit to USB hub PA. The manual switch 50 as shown in FIGS. 1, 5 and 6 is depicted by its effect in FIG. 4, as providing an external signal coming to the device at the OTG modules control. The signal is characterized as "forced_roles_manual_control" signal 50, and connects to both the standard USB hubs 14A and 14B in FIG. 1 and only to the "Arbitration" blocks 21 and 31 in FIGS. 5 and 6. As a default, the OTG module 12B at OTG port PB as connected to upstream port H' of USB hub PB, provides a master/host status to an OTG device connected to OTG port PB. The device connected at OTG port PB in turn is switched by multilane USB switch 11 to control peripheral devices connected to downstream ports D2 . . . Dn.

For dynamic or automatic switching, a priority needs to be established among ports (this may be a default priority which may be overwritten by users), so that in case multiple OTG ports 14A and 14B are connected at the same time to host ports, only the one with the highest priority may configure itself as an upstream port, while the ones with lower priority may configure themselves as downstream. This is, for example, shown in FIG. 1 as a signal flag 60 labeled "higher_priority_port_config_as_upstream" with connection as an input to both OTG modules 12A and 12B. In FIGS. 5 and 6, this is embodied as an internal signal in the arbitration blocks 21 and 31 and is not shown.

If a second OTG device is connected to OTG port PA instead of a PC, the OTG devices alternate between master and slave states relative to each other. In such configuration the lines from downstream ports B1 and A1 allow the OTG device at OTG port PB to be a master and the device at OTG port PA to be the slave or peripheral and the OTG device at OTG port PA to be a master and the device at OTG port PB to be the slave or peripheral, respectively.

Figure 2A:
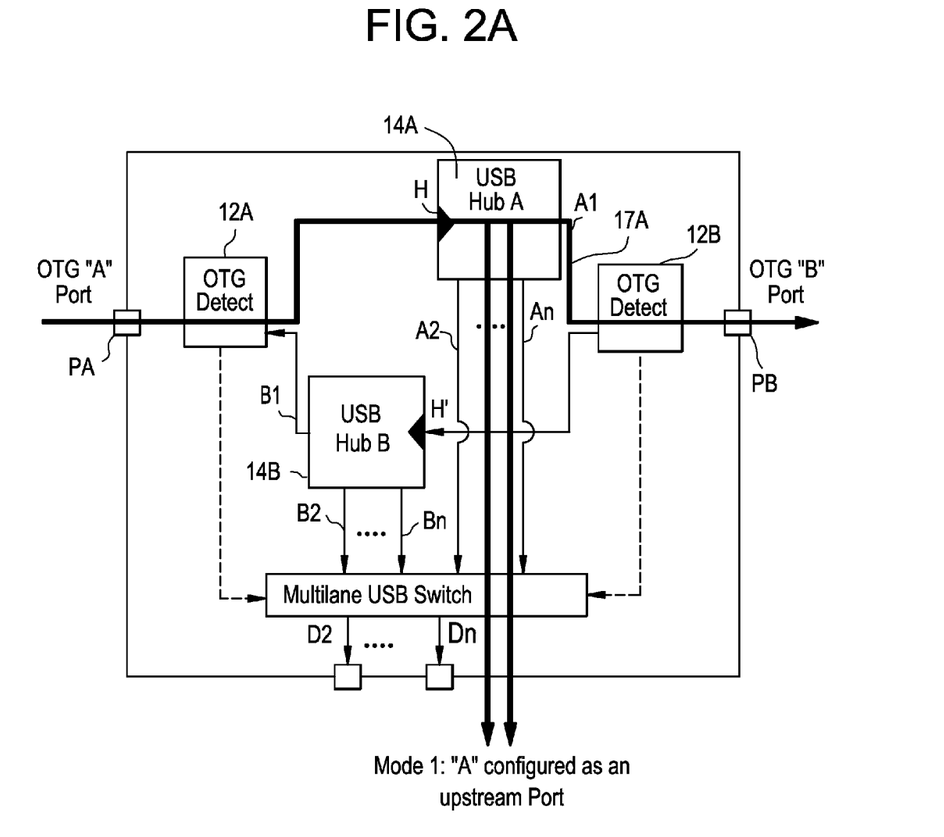
FIG. 2A is the circuit overview of FIG. 1, showing a first Mode wherein OTG Port PA is configured as an upstream port, according to one embodiment.
Figure 2B:
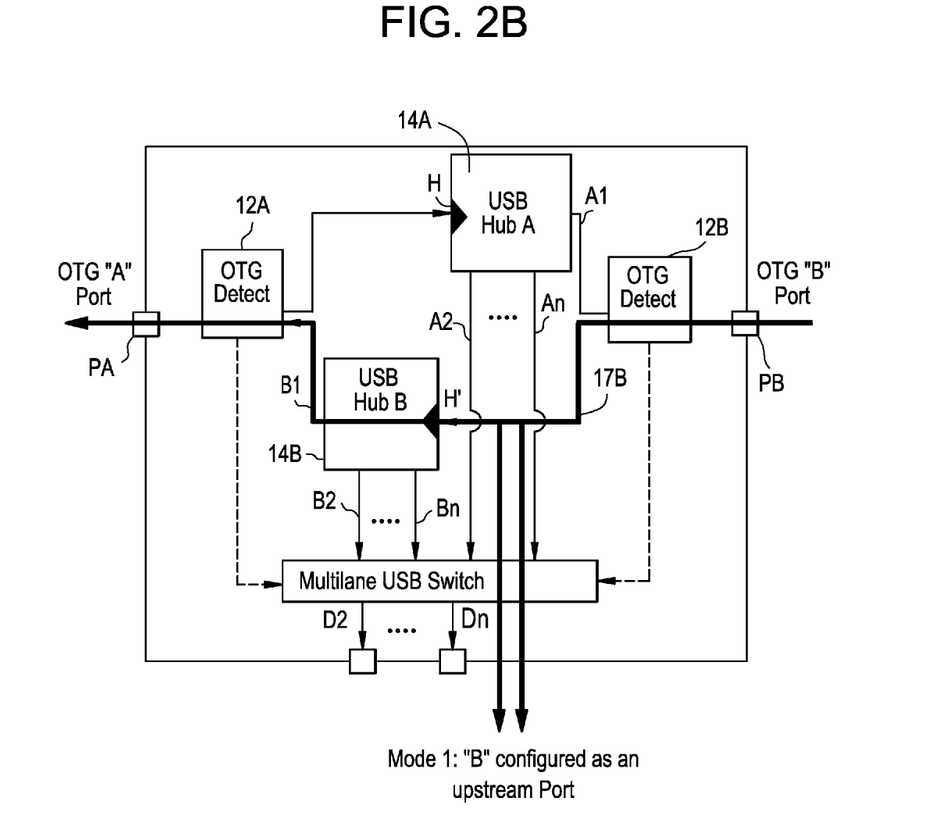
FIG. 2B is the circuit overview of FIG. 1, showing an embodiment depicting a second Mode switched from the first Mode of FIG. 2A with OTG Port PB being configured as an upstream port.

The circuit routing arrows 17A and 17B from OTG port PA and PB respectively to downstream ports of standard USB hubs 14A and 14B respectively in FIGS. 2A and 2B show the different Modes 1 and 2, wherein OTG Port PA is configured as an upstream port (with a connected device thereto being the master/host) and OTG Port PB being configured as an upstream port (with a connected device being the master/host), respectively. Where OTG port PA is an upstream port in FIG. 2A, OTG port PB is downstream and where OTG port PB is the upstream port as in FIG. 2B, OTG port PA is downstream.

Figure 3:
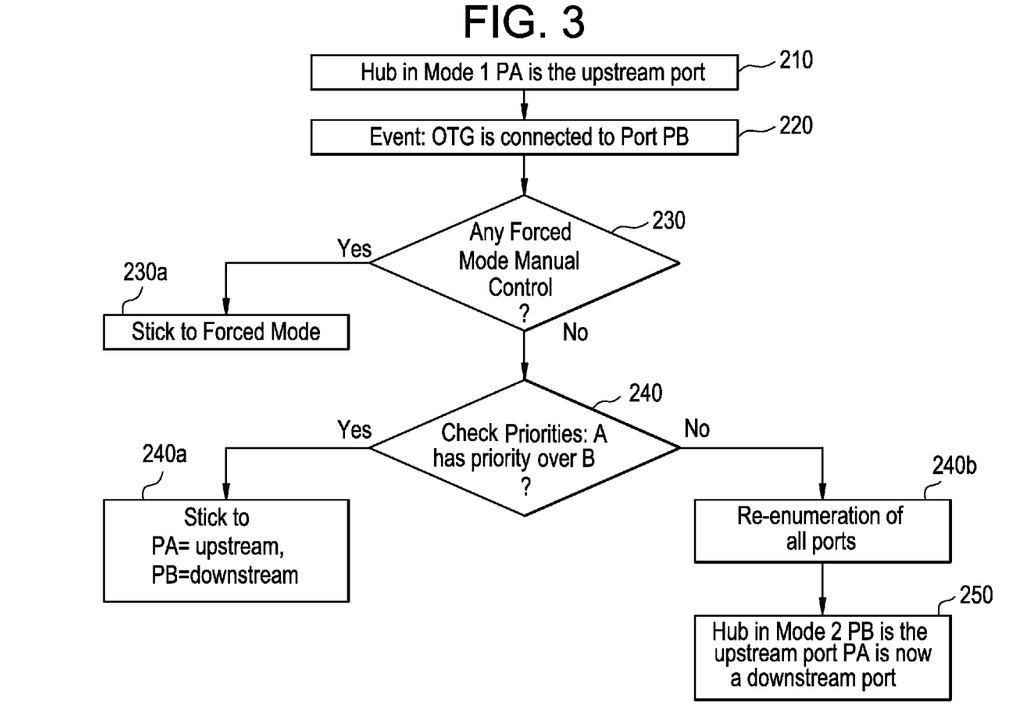
FIG. 3 is a flow chart a mode switching process, according to one embodiment.

The mode switching, as embodied in FIGS. 2A and 2B, is schematically set forth in the flow chart of FIG. 3. With OTG port PA, starting in hub device 10 in Mode 1 as the upstream port in block 210 and an OTG device being connected to OTG port PB, a decision may be made with respect to whether there is a forced mode manual control (as with control element 50 of FIG. 1). If Yes, then as in block 230a, the device remains in the forced mode. If No, then there is a check of priorities between ports PA and PB, as in decision block 240. If Yes, then the configuration remains as in block 240a with OTG port PA remaining upstream and port PB remaining downstream. If the priorities decision is No, then there is a re-enumeration of all the ports (block 240a). A switching action occurs in block 250 with hub device 10 being in Mode 2, with OTG port PB being switched to be the upstream port and OTG port PA being switched to be a downstream port.

Figure 4:
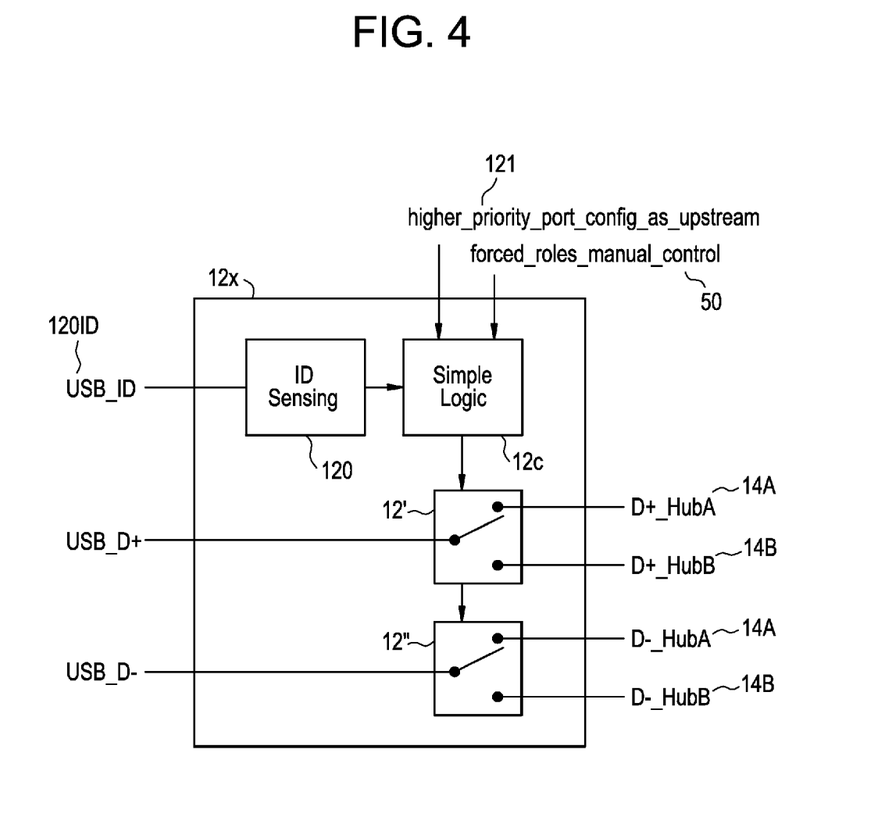
FIG. 4 is a schematic representation of an embodiment of the OTG module in FIG. 1 with functionality as a switching element between the multiple masters.

FIG. 4 schematically depicts details, according to one embodiment, of any of the OTG modules, designated generically as 12x, which embodies port and USB ID 120 leading to a simple logic element 12c controlled with the parameters of "higher_priority_port_config_as_upstream" 121 and "forced_roles_manual_control" 50 to determine and effect master/host switching 12' and 12" between the standard hubs 14A and 14B and the devices connected thereto.

The generalization of multiple n+1 number of OTG ports with alternating master/slave switching of OTG devices connected to the ports is similarly effected in the embodiment associated with FIG. 5, with the multi-master USB hub 20 having separate n+1 OTG modules $12_0$ to $12_n$, each connected to the upstream port of standard USB hubs $14_0$ to $14_n$ respectively. Interconnections between downstream ports of the USB hubs and the OTG modules of other standard USB hubs is in serial connection as depicted in FIG. 1. As in FIG. 1, the downstream ports U0.1 to U0.n of each of the USB hubs $14_0$ to $14n$ are connected to the n×n switch 39, for selective connection between the various OTG devices with internal downstream connection of the switch via ports D0 to Dn to OTG modules $12_0$ to $12n$ of OTG ports $P_0$ to Pn. Arbitration element 21, connected between OTG module $12_0$ and the n×n switch 39 selects the OTG devices to be connected and their relative status (with one being a master and the remainder (or selected OTG devices) being slaves or peripherals), on a dynamic basis.

OTG is by definition a superset of downstream/upstream since it may act as both master and slave. Accordingly, the device configuration in FIG. 5 may able to connect between OTG ports. However, it is a superset which may also connect to peripherals or even act as a standard hub. This comes with a trade-off, in that each flexible OTG port on the device requires an expensive internal matching standard hub whereas a pure fixed-function downstream port is relatively inexpensive to add. With this trade-off there may be a further embodiment of a device configuration shown in FIG. 6, containing a specific number of fixed-function ports.

In FIG. 6, the generalization of the multi master USB hub device 20 in FIG. 5 may be further extended to multiple master USB hub device 30 to provide for external downstream connections D1 to Dm to external peripheral OTG devices in addition to the internal connections. The embodiment of FIG. 6 differs from that of FIG. 5 with the inclusion of the downstream connections of fixed-function ports D1 to Dm as peripheral ports from switch 49. In this embodiment there are n+m number of peripheral ports (n number of standard hub ports and m number of external fixed ports).

Figure 7:
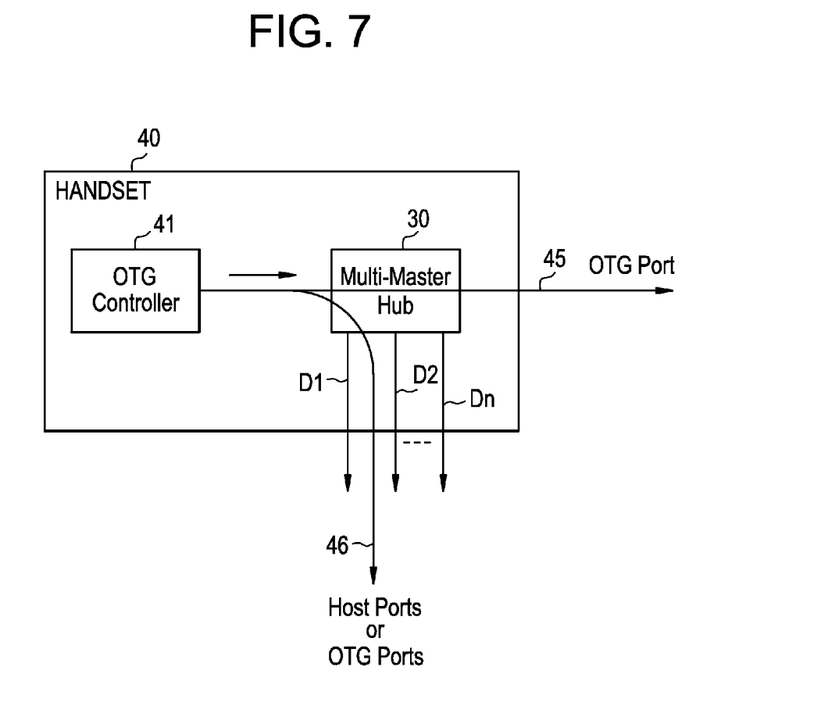
FIG. 7 schematically depicts function with a handset port connection according to one embodiment.

With the multi-master hub 30 of FIG. 6, and, as schematically shown in FIG. 7, a handset 40 (e.g. cell phone) may be connected via OTG controller 41 to the multi-master hub 30, to multiple OTG ports 45 and 46, and optionally to a host port, with OTG master/slave switchability being maintained. In addition, peripheral downstream ports D1 to Dn permit the USB connection to numerous peripherals.

Figure 8A:
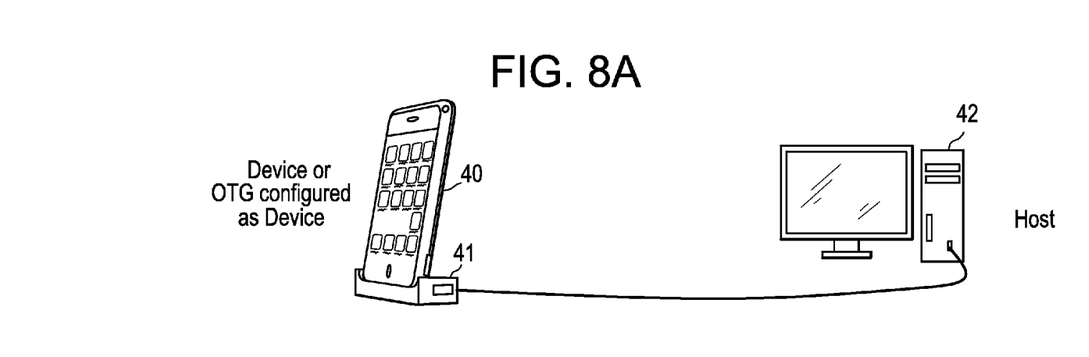
FIGS. 8a and 8b graphically and schematically depict an in-cradle connection of a cell phone handset and a PC with the multi-master hub, according to one embodiment.
Figure 8B:
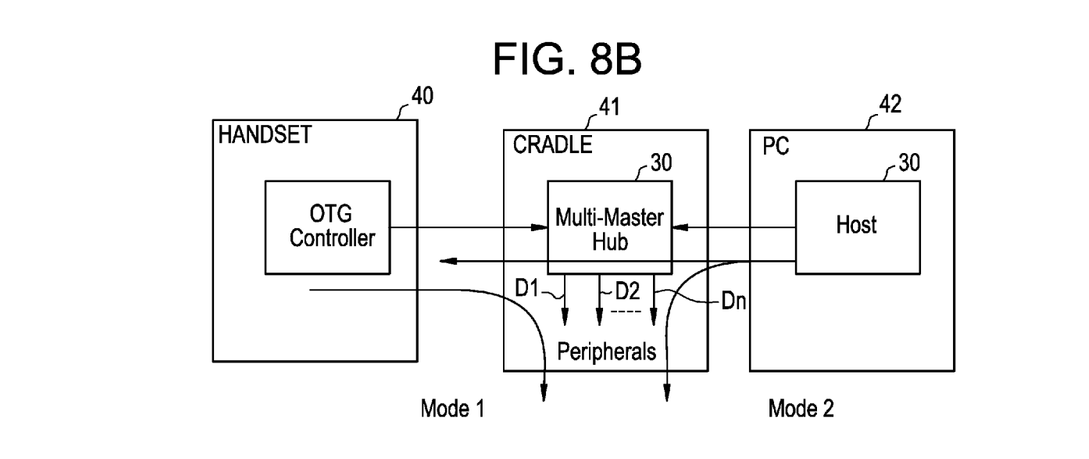

As depicted in the embodiments of FIGS. 8A and 8B, the handset 40, with OTG controller 41, may be connected to the multi-master hub 30 in the cradle 43, controls peripherals connected to the multi-master hub 30 in Mode 1 at downstream ports D1-Dn. PC host 42 also connected to the multi-master hub 30 in the cradle 43 may also control the peripherals in Mode 2. Mode 1 and Mode 2 may be effected by a switching element 50 in the multi-master hub in the cradle or by dynamic switching, as referred to above.

Figure 9A:
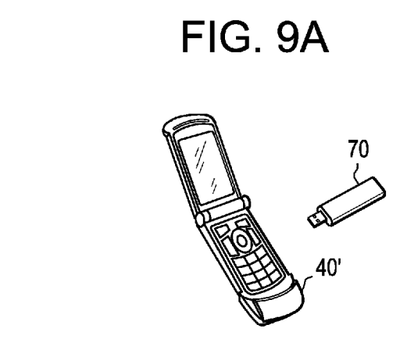
FIGS. 9a-9d graphically and schematically depicts embodiments of handset devices with integrated USB controller elements.
Figure 9B:
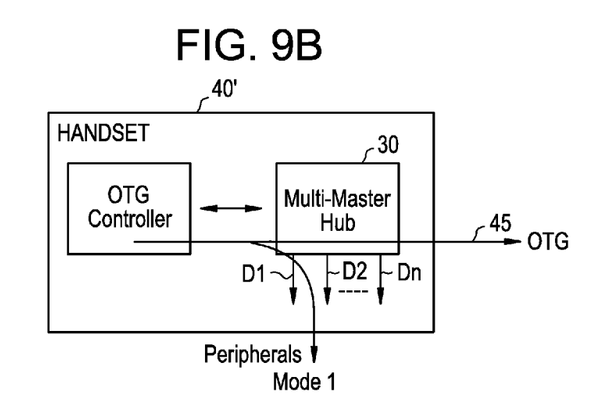

FIGS. 9A and 9B depict application embodiments including a handset 40' using a bridging device, such as a device from the family of West Bridge® devices made by Cypress Semiconductor Corp. of San Jose, Calif., which in this application is a controller 41' which switches ownership of storage (flash drive 70) between the phone main processor (normal operation) and the PC (when a phone is connected to a PC for synchronization). In this example, the West Bridge® device may be implemented using a multi-master hub 30, which may connect to the main processor and the PC via OTG port 45, and to storage via peripheral ports D1-Dn at 46. By dynamically switching ownership to the PC when the PC connects to the multi-master hub 30, this implementation may reproduce the same functionality as a West Bridge device.

Figure 9C:
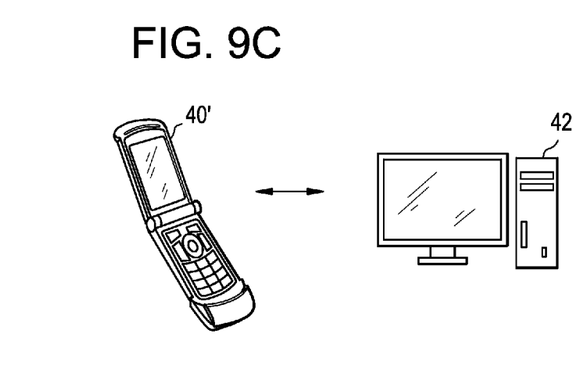
Figure 9D:
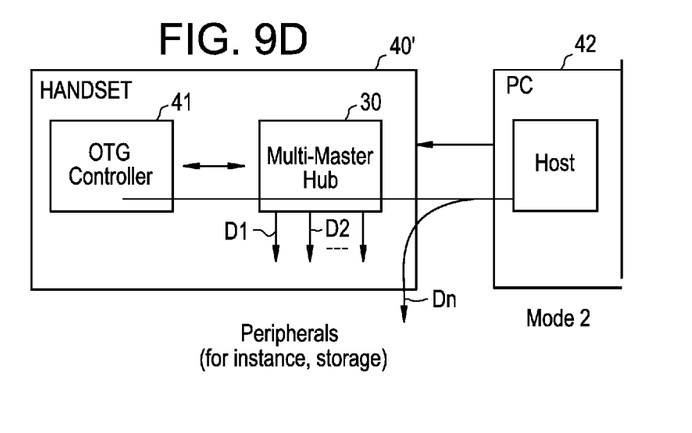

FIGS. 9C and 9D depict an embodiment including the handset 40' with integrated multi-master hub 30 and connections similar to that of FIGS. 8A and 8B without the cradle.

It is understood that the above description and illustrative examples are only exemplary, with changes in configuration, components and functions being possible without departing from the scope as defined in the following claims.

What is claimed is:

1. An apparatus comprising:
a multiple master USB hub device comprising a first OTG port, a first standard USB hub, a second OTG port, and a second standard USB hub, wherein the first OTG port is coupled to an upstream port of the first standard USB hub and the second OTG port is coupled to an upstream port of the second standard USB hub,
the multiple master USB hub device configured to enable two USB devices connected thereto through the first OTG port and the second OTG port respectively to operate as a host/master to control OTG and peripheral/slave devices connected to the multiple master USB hub device, wherein the multiple master USB hub device comprises an element configured to switch between enabling one of the two USB devices to operate as the host/master and enabling another of the two USB devices to operate as the host/master.

2. The multiple master USB hub device of claim 1, wherein the multiple master USB hub device is configured to permit each of the two USB devices to be configured as the host/master a plurality of times, at predetermined times.

3. The multiple master USB hub device of claim 1, wherein one two USB devices is a PC and the other of the two USB devices is an OTG USB device; or wherein both of the two USB devices are OTG USB devices.

4. The multiple master USB hub device of claim 1, wherein the multiple master USB hub device comprises n number of OTG ports with each OTG port being configured for connection to a USB device, with each USB device retaining capability of being either a host/master or a slave/peripheral and the multiple master USB hub device comprises m number of USB ports each configured for connection to a slave/peripheral, wherein the multiple master USB hub device is capable of connecting to one master and n−1+m peripherals at any given time and wherein the multiple USB hub device is capable of having n number USB devices connected as host/masters at different times, whereby each USB device is capable of controlling n−1+m USB devices and peripherals.

5. The multiple master USB hub device of claim 4, wherein the n number of USB devices include USB OTG devices selected from the group consisting of hand held cell phones, cell phone cradles, electronic tablets, book readers, PDAs, mp3 players, cameras, card readers, printers and DVD reader/writers.

6. The multiple master USB hub device of claim 4, wherein at least one of the two USB includes a USB OTG device in a cradle for a cell phone.

7. A multiple master USB hub device comprising:
i) at least two standard USB hubs, each having a single upstream port and multiple downstream ports;
ii) multiple USB OTG ports each configured for connection to a respective OTG device, the number of USB OTG ports being at least equal to the number of contained standard USB hubs, with each USB OTG port being connected to a respective one of the at least two standard USB hubs at the upstream port thereof;
iii) multiple OTG modules, with at least one OTG module being connected to and associated with a respective USB OTG port and positioned in a connection between an associated USB OTG port and an upstream port of a respective standard USB hub, each OTG module being configured to detect or determine OTG status of an OTG device connected to an OTG port associated therewith, as master or slave, at any given moment, with each OTG module being connected to an upstream port of a respective standard USB hub and to a downstream port of another standard USB hub, wherein, when one OTG module detects or determines that the OTG port associated therewith is connected to an OTG device with a master status, the one OTG module, maintains an electrical connection to the connected upstream port of a connected standard USB hub device and remaining OTG modules disconnect electrical connection to their respective standard USB hub upstream ports and remaining OTG modules each connect to downstream ports of the standard USB hubs; and
iv) a switching element configured to selectively change between master and slave status of each of OTG devices connected to the respective USB OTG ports and to cause the respective OTG modules to direct appropriate connection of respective USB OTG devices to an upstream or downstream port of a standard USB hub.

8. The multiple master USB hub device of claim 7, wherein each of the OTG modules contains a switching element configured to selectively change master and slave status of each of the OTG devices and whereby the OTG modules are configured to cooperatively act with each other to provide selected master and slave change.

9. The multiple master USB hub device of claim 8, wherein the switching element in each OTG module is in a digital circuit with an OTG device identity sensor element and a logic element to selectively route switching change of master and slave status.

10. The multiple master USB hub device of claim 7, wherein the switching element is configured to selectively change master and slave status of each of OTG devices connected to the respective USB OTG ports and to cause the respective OTG modules to direct appropriate connection of the respective USB OTG devices to an upstream or downstream port of a USB hub, and wherein the switching element comprises a manually operable switching element.

11. The multiple master USB hub device of claim 7, wherein the switching element is configured to selectively change master and slave status of each of OTG devices connected to the respective USB OTG ports and to cause the respective OTG modules to direct appropriate connection of the respective USB OTG devices to an upstream or downstream port of a standard USB hub, the switching element comprises an automatic switching element operatively triggered by one of a preset operating condition and a preset time interval.

12. The multiple master USB hub device of claim 7, wherein the multiple master USB hub device is configured to enable a host PC and a handheld OTG device to be connected thereto, to selectively alternatively control a peripheral device and whereby the PC is selectively able to control the handheld OTG device as a peripheral slave.

13. The multiple master USB hub device of claim 12 wherein the USB hub is configured to enable the handheld OTG device and host PC to share control of a memory device for upload or download operations.

14. The multiple master USB hub device of claim 7 wherein the USB hub device is configured to enable at least two OTG devices to be connected thereto to selectively alternatively control a peripheral device and whereby each of the OTG devices is selectively able to control the other OTG devices as peripheral slaves.

15. The multiple master USB hub device of claim 7, wherein the multiple master USB hub device comprises n number of OTG USB ports with each OTG USB port being configured for connection to an OTG USB device, with each OTG USB device retaining capability of being either a host/master or a slave/peripheral and the multiple master USB hub device comprises m number of USB ports each configured for connection to a slave/peripheral, wherein the USB hub device is capable of connecting to one master and n−1+m peripherals at any given time and wherein the USB hub device is capable of having n number OTG USB devices connected as host/masters at different times, whereby each OTG device is capable of controlling n−1+m USB OTG devices and peripherals.

16. The multiple master USB hub device of claim 7, wherein the n number of OTG USB devices are selected from the group consisting of hand held cell phones, cell phone cradles, electronic tablets, book readers, PDAs, mp3 players, cameras, card readers, printers and dvd reader/writers.

17. A method comprising:
configuring one of a USB OTG device and a host USB device to assume a host/master configuration wherein the one of the USB OTG device and the host USB device is coupled to an upstream port of a first standard USB hub through a first USB OTG port of a multiple master USB hub;
configuring another USB OTG device to assume a peripheral/slave configuration while the one of the USB OTG device and the host USB device assumes the host/master configuration, wherein the other USB OTG device is coupled to an upstream port of a second standard USB hub through a second USB OTG port of the multiple master USB hub; and
switching host/master control from the one of the USB OTG device and the host USB device to the other USB OTG device.

18. The method of claim 17, wherein the one of the USB OTG device and the host USB device and the other USB OTG device are permitted to assume host/master configuration a non-zero number of times.

19. The method of claim 18, wherein the multiple master USB hub comprises n number of USB OTG ports with each USB OTG port being configured for connection to a USB OTG device, with each USB OTG device retaining capability of being either a host/master or a slave/peripheral and the multiple master USB hub device comprises m number of USB ports each configured for connection to a slave/peripheral, wherein the multiple master USB hub device is capable of connecting to one master and n−1+m peripherals at any given time and wherein the multiple master USB hub device is capable of having n number USB OTG devices connected as host/masters at different times, whereby each USB OTG device is capable of controlling n−1+m USB OTG devices and peripherals, and wherein the n number of USB OTG devices are selected from the group consisting of hand held cell phones, cell phone cradles, electronic tablets, book readers, PDAs, mp3 players, cameras, card readers, printers and dvd reader/writers.

20. A method for enabling multiple OTG and host devices to control peripherals and slave devices with a single USB hub connection, the method comprising:
a) connecting at least two standard USB hubs within a housing to a corresponding number of USB OTG ports with external USB connection elements, wherein each USB OTG port is connected to an upstream port of one of the standard USB hubs respectively and to a downstream port of the other of the standard USB hubs;
b) connecting at least two of any combination of host and OTG USB devices to the external USB connections;
c) automatically or manually activating one connection between a USB OTG port and the upstream hub port to which it connected whereby a host or OTG USB device connected to the USB OTG port assumes a host/master configuration and wherein connection between the remaining USB OTG ports and their respective hub ports are deactivated whereby remaining OTG USB devices connected to other USB OTG ports are actively connected to downstream hub ports to assume peripheral/slave configurations;
d) automatically or manually effecting the process of paragraph c with another selected USB OTG port to switch host/master configuration to a host or OTG USB device connected to the selected OTG USB port; and
e) repeating processes c and d as necessary or desired.

* * * * *